United States Patent [19]
Lawlor

[11] Patent Number: 5,709,076
[45] Date of Patent: Jan. 20, 1998

[54] METHOD AND APPARATUS FOR POWER GENERATION USING ROTATING RAMJET WHICH COMPRESSES INLET AIR AND EXPANDS EXHAUST GAS AGAINST STATIONARY PERIPHERAL WALL

[76] Inventor: Shawn P. Lawlor, 7113 139th Pl. NE., Redmond, Wash. 98052

[21] Appl. No.: 480,663

[22] Filed: Jun. 7, 1995

Related U.S. Application Data

[60] Continuation-in-part of Ser. No. 213,217, Mar. 14, 1994, which is a division of Ser. No. 945,228, Sep. 14, 1992, Pat. No. 5,372,005.

[51] Int. Cl.$^6$ ........................................ F02C 3/14
[52] U.S. Cl. .................. 60/39.35; 60/39.02; 60/39.182; 60/270.1; 416/22
[58] Field of Search ................. 60/39.34, 39.35, 60/39.182, 270.1, 39.02; 122/7 R; 416/20 R, 21, 22

[56] References Cited

U.S. PATENT DOCUMENTS

| | | |
|---|---|---|
| 898,753 | 9/1908 | Lees et al. |
| 1,287,049 | 12/1918 | Kramer . |
| 1,945,608 | 2/1934 | Hill . |
| 2,115,338 | 4/1938 | Lysholm . |
| 2,180,168 | 11/1939 | Puffer . |

(List continued on next page.)

FOREIGN PATENT DOCUMENTS

| | | |
|---|---|---|
| 627121 | 9/1927 | France . |
| 863484 | 2/1940 | France . |
| 1407868 | 6/1964 | France . |
| 554906 | 11/1932 | Germany . |
| 3144347 | 7/1981 | Germany . |
| 3561 | 8/1881 | United Kingdom . |
| 366450 | 7/1929 | United Kingdom . |
| 400894 | 7/1932 | United Kingdom . |
| 581217 | 6/1944 | United Kingdom . |
| 645641 | 7/1948 | United Kingdom . |
| 648647 | 1/1951 | United Kingdom ............... 60/39.35 |
| 2045870 | 3/1979 | United Kingdom . |
| 2165310 | 10/1984 | United Kingdom ............... 60/39.35 |
| 90/01625 | 7/1989 | WIPO . |

OTHER PUBLICATIONS

Liepmann, H.W. and Roshko, A., Elements of Gasdynamics, John Wiley & Sons, Inc., New York, 1957, pp. 114–119.

Hoerner, S.F., Fluid-Dynamic Drag, Horner Fluid Dynamics, New Mexico, 1965, pp. 16–35.

(List continued on next page.)

*Primary Examiner*—Timothy Thorpe
*Assistant Examiner*—Ted Kim
*Attorney, Agent, or Firm*—R. Reams Goodloe, Jr.

[57] ABSTRACT

Novel power generation method and apparatus. At least partially unshrouded type supersonic ramjet thrust module (s) are provided at the periphery of a low aerodynamic drag tapered disc rotor. The rotor is affixed at a central hub to a shaft, and rotates about an axis defined by the shaft. The rotor acts as a structural member which transmits to the shaft the thrust generated by the ramjets. In the preferred embodiment, an unshrouded ramjet inlet captures and compresses an impinging inlet air stream by utilizing the thrust module inlet structures and an adjacent housing sidewall. The compressed air inlet stream provides oxygen for mixing with a fuel such as natural gas which is injected into the through flow air stream upwind of the ramjet thrust modules. Fuel is oxidized in the ramjet thrust module(s) to produce expanding combustion gases. Such gases escape out through the unshrouded ramjet nozzle, acting against outlet structures and an adjacent housing sidewall, rotating the ramjet at supersonic velocities, and producing shaft energy. Enthalpy in escaping combustion gases is substantially segregated in an outlet duct and may be utilized thermally or mechanically via suitable heat exchange device. Efficient mixing in the inlet shock and short residence times in the combustion chamber, enable low nitrogen oxides formation to be achieved.

45 Claims, 10 Drawing Sheets

U.S. PATENT DOCUMENTS

| | | |
|---|---|---|
| 2,220,066 | 11/1940 | Cornell, Jr. |
| 2,395,403 | 2/1946 | Goddard |
| 2,402,826 | 6/1946 | Lubbock |
| 2,444,742 | 7/1948 | Lutjen |
| 2,446,266 | 8/1948 | Cummings |
| 2,448,972 | 9/1948 | Gizara |
| 2,465,856 | 3/1949 | Emigh |
| 2,474,685 | 6/1949 | McCollum |
| 2,481,235 | 9/1949 | Parr et al. |
| 2,486,990 | 11/1949 | Sharpe |
| 2,499,863 | 3/1950 | Hart |
| 2,509,359 | 5/1950 | Margolis |
| 2,523,655 | 9/1950 | Goddard |
| 2,590,109 | 3/1952 | Lindenbaum |
| 2,603,947 | 7/1952 | Howard |
| 2,628,473 | 2/1953 | Frye |
| 2,690,809 | 10/1954 | Kerry .................................. 60/39.35 |
| 2,709,889 | 6/1955 | Mount |
| 2,709,895 | 6/1955 | Mount .................................. 60/39.35 |
| 2,710,067 | 6/1955 | Del Pesaro .......................... 60/39.35 |
| 2,895,259 | 7/1959 | Beckett |
| 2,994,195 | 8/1961 | Carswell |
| 3,001,364 | 9/1961 | Woodworth |
| 3,118,277 | 1/1964 | Wormser ............................... 60/39.35 |
| 3,200,588 | 8/1965 | Math ..................................... 60/39.35 |
| 3,299,961 | 1/1967 | Coplin et al. |
| 3,371,718 | 3/1968 | Bacon |
| 3,541,787 | 11/1970 | Romoli |
| 3,543,520 | 12/1970 | Kelley et al. |
| 3,811,275 | 5/1974 | Mastrobuono |
| 3,909,082 | 9/1975 | Ishikawa et al. |
| 3,937,009 | 2/1976 | Coleman |
| 4,024,705 | 5/1977 | Hedrick ................................ 60/39.35 |
| 4,091,687 | 5/1978 | Meinke et al. |
| 4,208,590 | 6/1980 | Blomquist et al. ................... 60/39.35 |
| 4,272,953 | 6/1981 | Rice |
| 4,285,553 | 8/1981 | Robinson |
| 4,337,981 | 7/1982 | Meinke |
| 4,577,460 | 3/1986 | Wirsching |
| 4,821,512 | 4/1989 | Guile et al. |
| 4,969,326 | 11/1990 | Blessing et al. |
| 5,044,163 | 9/1991 | Bruckner et al. |
| 5,058,826 | 10/1991 | Coffinberry |
| 5,129,227 | 7/1992 | Klees et al. ......................... 60/270.1 |
| 5,161,368 | 11/1992 | Pomerleau |
| 5,408,824 | 4/1995 | Schlote |

OTHER PUBLICATIONS

Shapiro, A.H., The Dynamics and Thermodynamics of Compressible Flow, John Wiley & Sons, Inc., New York, 1953, pp. 454–456; 579–580.

Schlichting, H., Boundary–Layer Theory, McGraw–Hill, Inc., New York, 1979, pp. 102–107; 646–653.

Theodorsen, T., and Regier, A., "Experiments On Drag Of Revolving Disks, Cylinders, And Streamline Rods At High Speeds," NACA Rept 793, 1944.

Millsaps, K., and Pohlhausen, K., "Heat Transfer by Laminar Flow From A Rotating Plate," Journal of Aeronautical Sciences, vol. XX, 1952, pp. 120–126.

Ostrach, S., and Thornton, P.R., "Compressible Laminar Flor and Heat Transfer About A Rotating Isothermal Disk," NACA Tech. Note 4320, 1958.

Sparrow, E.M., and Gregg, J.L., "Mass Transfer, Flow and Heat Transfer About A Rotating Disk," ASME Paper 59–A–107, 1960.

Dutton, J.C. and Addy, A.L., "A Theoretical and Experimental Investigation of the Constant Area, Supersonic–Supersonic Ejector," AIAA Journal, vol. 20, No. 10, 1982, pp. 1392–1400.

Dutton, J.C., and Carroll, B.F., "Optimal Supersonic Ejector Designs," ASME Paper 86–WA/FE–3, Journal of Fluids Engineering, vol. 108, 1982, pp. 414–420.

Dutton, J.C., and Carroll, B.F., "Limitation of Ejector Performance Due to Exit Choking," Tech Brief, Journal of Fluids Engineering, vol. 110, 1988, p. 91.

Oates, G.C., Aerothermodynamics of Gas Turbine and Rocket Propulsion, American Institute of Aeronautics and Astronautics, Inc., New York, 1984, pp. 119–139.

Anderson, J.D., Introduction To Flight, McGraw Hill, Inc., New York, 1978, pp. 353–357.

Carpenter, P.J., and Radin, E.J., "Investigation of A Ramjet Powered Helicopter Rotor on the Langley Helicopter Test Tower," NACA Res. Memo L53D02, Jun. 1953.

Radin, E.J., and Carpenter, P.J., "Comparison of the Performance of a Helicopter–Type Ram–Jet Engine Under Various Centrifugal Loadings," NACA Res. Memo L53H18A, Oct. 1953.

Hertzberg, A. et al, "Ram Accelerator: A New Chemical Method For Accelerating Projectiles to Ultrahigh Velocities," AIAA Journal, vol. 26, pp. 195–203, Feb. 1988.

Weber, K.F., et al, "Analysis of Three–Dimensional Turbomachinery Flows on C–Type Grids Using an Implicit Euler Solver," Journal of Turbomachinery, vol. 112, pp. 362–369, Jul. 1990.

Yungster, S., et al, "Numerical Simulation of Hypervelocity Projectiles in Detonable Gases," AIAA Journal, vol. 29, No. 2, pp. 187–199, Feb. 1991.

Pratt, D.T. et al, "Morphology of Standing Oblique Detonation Waves," AIAA Journal, vol. 7, No. 5, pp. 837–845, Sep.–Oct. 1991.

Bruckner, A.P., et al, "Operational Characteristics of The Ram Accelerator," Journal of Propulsion, vol. 7, No. 5, pp. 828–836, Sep.–Oct. 1991.

Van Wie, D., et al, "Application of Busemann Inlet Designs for Flight at Hypersonic Speeds," AIAA paper 92–1210, 1992 Aerospace Design Conference, Feb. 3–6, 1992.

Yungster, S. et al, "Computational Studies of a Superdetonative Ram Accelerator Mode," Journal of Propulsion and Power, vol. 8, No. 2, pp. 457–463, Mar.–Apr. 1992.

Bogdanoff, D., "Ram Accelerator Direct Space Launch System: New Concepts," Journal of Propulsion and Power, vol. 8, No. 2, pp. 481–490, Mar.–Apr. 1992.

Soetrisno, M., et al, "Numerical Simulations of the Transdetonative Ram Accelerator Combusting Flow Field on a Parallel Computer," AIAA paper 92–3249, AIAA/SAE/ASME/ASEE 28th Joint Propulsion Conference and Exhibit, Jul. 6–8, 1992.

Yungster, S., "Numerical Study of Shock–Wave/Boundary––Layer Interactions in Premixed Combustible Gases," AIAA Journal, vol. 30, No. 10, pp. 2379–2387, Oct. 1992.

Li, C., et al, "Numerical Simulations of Reactive Flows in Ram Accelerators," Naval Research Laboratory, Washington, D.C., presented at 29 JANNAF Combustion Mtg. Oct. 19–22, 1992.

Zhang, F., et al., "Stability Studies of Detonation Driven Projectiles," Paper Accepted for Presentation at Proceedings of the 19th Int'l Symposium on Shock Waves held at Marseille, France, Jul. 26–30, 1993.

Van Wie, D.M., "Application of Scramjet Engine Technology To The Design of Ram Accelerator Projectiles," presented at the JANNAF Combustion Meeting, Monterey, California, Nov. 15–18, 1993.

Pope, G.T., "Ramming Speed," Discover Magazine, vol. 15, No. 3, pp. 50–55, Mar., 1994.

Yungster, S., et al, "Computation of Shock–Induced Combustion Using A Detailed Methane–Air Mechanism," Journal of Propulsion and Power, vol. 10, No. 5, pp. 609–617, Sep.–Oct. 1994.

METHOD AND APPARATUS FOR POWER GENERATION USING ROTATING RAMJET WHICH COMPRESSES INLET AIR AND EXPANDS EXHAUST GAS AGAINST STATIONARY PERIPHERAL WALL

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

This invention is a continuation-in-part of prior application Ser. No. 08/213,217, filed Mar. 14, 1994, which is a divisional of application Ser. No. 07/945,228, filed Sep. 14, 1992, now U.S. Pat. No. 5,372,005, issued Dec. 13, 1994; the disclosures of each are incorporated herein by this reference.

TECHNICAL FIELD OF THE INVENTION

My invention relates to a novel, revolutionary apparatus and method for the generation of electrical and mechanical power while achieving very low emission rates of nitrogen oxides. More particularly, my invention relates to a power plant driven by ramjet engine thrust modules, and to novel rotors designed to withstand the extremely high tensile stress encountered while rotatably securing such ramjet thrust modules. Power plants Of that character are particularly useful for generation of electrical and mechanical power at efficiencies substantially improved over power plants currently in widespread commercial use.

BACKGROUND OF THE INVENTION

A continuing demand exists for a simple, highly efficient and inexpensive thermal power plant which can reliably provide electrical and mechanical power. A variety of medium size electrical and/or mechanical power plants could substantially benefit from a prime mover which provides a significant improvement from currently known efficiencies. Such medium size mechanical or electrical power plants—largely in the 10 to 100 megawatt range—are required in a wide range of industrial applications, including rail locomotives, marine power systems, aircraft engines, and stationary electric power generating units. Power plants in this general size range are also well suited to use in industrial and utility cogeneration facilities. Such facilities are increasingly employed to service thermal power needs while simultaneously generating electrical power.

Power plant designs which are now commonly utilized in co-generation applications include (a) gas turbines, driven by the combustion of natural gas, fuel oil, or other fuels, which capture the thermal and kinetic energy from the combustion gases, (b) steam turbines, driven by the steam which is generated in boilers from the combustion of coal, fuel oil, natural gas, solid waste, or other fuels, and (c) large scale reciprocating engines, usually diesel cycle and typically fired with fuel oils.

Of the currently available power plant technologies, diesel fueled reciprocating and advanced turbine engines have the highest efficiency levels. Efficiencies often range from 25% to 40%, based on net work produced when compared to the energy value of the fuel source. Unfortunately, with respect to the reciprocating engines, at power output levels greater than approximately 1 megawatt, the size of the pistons and other engine components required become almost unmanageably large, and as a result, widespread commercial use of such larger sized reciprocating engine systems has not been accomplished.

Gas turbines perform more reliably than reciprocating engines, and are therefore frequently employed in plants which have higher power output levels. However, because gas turbines are only moderately efficient in converting fuel to electrical energy, gas turbine powered plants are most effectively employed in co-generation systems where both electrical and thermal energy can be utilized. In that way, the moderate efficiency of a gas turbine can in part be counterbalanced by increasing the overall cycle efficiency.

Fossil fueled steam turbine electrical power generation systems are also of fairly low efficiency, often in the range of 30% to 40%. Such systems are commonly employed in both utility and industrial applications for base load electrical power generation. This is primarily due to the high reliability of such systems. However, like gas turbine equipment, steam turbine equipment is most advantageously employed in situations where both mechanical and thermal energy may be utilized, thus increasing overall cycle efficiency.

Because of their modest efficiency in conversion of fuel input to electrical output, the most widely used types of power plants, namely gas turbines and combustion powered steam turbine systems, depend upon co-generation in industrial settings to achieve acceptable costs of production for electricity. Therefore, it can be appreciated that it would be desirable to achieve reduced costs of electrical production by generating electrical power at higher overall efficiency rates than is commonly achieved today.

SUMMARY OF THE INVENTION

I have now invented, and disclose herein, improved details for the design of a novel, revolutionary power plant. My power plant design is based on the use of a ramjet engine as the prime mover, and has greatly increased efficiencies when compared to those heretofore used power plants of which I am aware. Unlike many power plants commonly in use today, my power plant design is simple, compact, relatively inexpensive, easy to install and to service, and is otherwise superior to currently operating plants of which I am aware.

My novel power plants have a unique low aerodynamic drag rotor portion. The rotor is preferably constructed utilizing a disc of high strength composite materials. It can be operated at rotating speeds well above those which would induce tensile and compressive strains that would cause materials such as conventional steel or titanium alloys to fail in structures of similar shape.

The aerodynamic design used in my power plant overcomes two important and serious problems. First, at the supersonic tip speeds at which my device operates, the aerodynamic design minimizes drag. Thus, it minimizes parasitic losses to the power plant due to the drag resulting from the movement of the rotor through an airstream. This is important commercially because it enables a power plant to avoid large parasitic losses that undesirably consume fuel and reduce overall efficiency. Second, the materials design and specification provides the necessary tensile and compressive strength, where needed in the rotor, to prevent internal separation of the rotor by virtue of the centrifugal and centripetal forces acting on the rotor materials.

I have now developed a novel rotor design for use in combination with a ramjet driven power generation system. In one embodiment, the rotor section comprises a solid disc.

The rotor section rotates in a housing which uses boundary layer removal via way of air injection on the rotor face.

Attached to the periphery of the rotor are inboard portions of ramjet engine thrust modules. The inboard portions of the ramjet engine thrust modules are situated so as to engage and to compress that portion of the airstream which is impinged by the ramjet upon its rotation. Compression of inlet air and escapement of combustion gas occurs between the inboard portions of the ramjet engine thrust modules and the interior wall surface of the outboard, peripheral housing wall. I have also provided in my design a feature to insure that a relatively clean airstream (free of the ramjet thrust module's own wake turbulence) will be encountered by the rotating ramjet thrust module. This is accomplished by rotating the inboard ramjet portion in a supplied air plenum, and circulating through the supplied air plenum an airstream which replaces the gases scooped up by the ramjet thrust module, and which sweeps away its aerodynamic wake.

Fuel is injected by adding it to the air which is to be captured and compressed at the ramjet thrust module inlet. The fuel may be conveniently provided to the ramjet engine combustion chamber through use of fuel supply passageways communicating between the fuel source and the interior housing. The fuel injection ports allow fuel to enter the air stream to be mixed with the inlet air before it arrives at the ramjet engine combustion chamber. The combustion gases formed by oxidation of the fuel escape rearwardly from the ramjet nozzle, thrusting the ramjet tangentially, thus turning the rotor and the output shaft portions. The power generated by the turning shaft may be used directly in mechanical form, or may be used to power an electrical generator and thus generate electricity.

Preferably, exhaust combustion gases from the ramjet are substantially separated by a dry knife edge from the outbound air stream travelling through the supplied air plenum. In my improved cogeneration plant design, the combustion exhaust gas duct is used to collect and discharge the exhaust gas stream to a conduit for transport to a heat exchanger, where the gases may be cooled by way of heating up a heat transfer fluid, such as water, in which case the production of hot water or steam results. The heat transfer fluid may be utilized for thermal purposes, or for mechanical purposes, such as driving a steam turbine.

Ultimately, the cooled combustion gases are exhausted to the ambient air. However, by way of the unique technique of completely mixing combustion gas in the supersonic shocks between the ramjet inlet ramps, and due to the short residence time in the combustor, my novel power plant minimizes production of nitrogen oxide to emission levels well below those currently achieved in the industry. Further, variations in the air flow configuration and in provision of the fuel supply may be made by those skilled in the art without departing from the teachings hereof. Finally, in addition to the foregoing, my novel power plant is simple, durable, and relatively inexpensive to manufacture.

OBJECTS, ADVANTAGES, AND FEATURES OF THE INVENTION

From the foregoing, it will be apparent to the reader that one important and primary object of the present invention resides in the provision of novel, improved mechanical devices to generate mechanical and electrical power.

More specifically, an important object of my invention is to provide a ramjet driven power generation plant which is capable of withstanding the stress and strain of high speed rotation, so as to reliably provide a method of power generation at high efficiency.

Other important but more specific objects of the invention reside in the provision of power generation plants as described in the preceding paragraph which:

allow the generation of power to be done in a simple, direct manner;

have a minimum of mechanical parts;

avoid complex subsystems;

require less physical space than existing technology power plants;

are easy to construct, to start, and to service;

have high efficiency rates; that is, to provide high heat and high work outputs relative to the heating value of fuel input to the power plant;

in conjunction with the preceding object, provide lower power costs to the power plant operator and thus to the power purchaser than is presently the case;

cleanly burns fossil fuels;

in conjunction with the just mentioned object, results in fewer negative environmental impacts than most power generation facilities currently in use;

have a fuel supply design which efficiently supplies a ramjet;

have a rotating element with a structure able to withstand the stresses and strains of rotating at very high tip speeds; and which have a rotating element design which provides operation with minimal aerodynamic drag.

A feature of one embodiment of the present invention is the use of a novel aerodynamic design configuration which provides minimal aerodynamic drag at high rotational design tip speeds, thereby enabling the power plant to minimize parasitic losses, with the resulting advantage of high overall cycle efficiencies.

Another feature of the present invention is the use of a high strength rotor structure.

Other important objects, features, and additional advantages of my invention will become apparent to those skilled in the art from the foregoing and from the detailed description which follows and the appended claims, in conjunction with the accompanying drawing.

BRIEF DESCRIPTION OF THE DRAWING

In the drawing, identical structures shown in the several figures will be referred to by identical reference numerals without further mention.

DETAILED DESCRIPTION OF INVENTION

Figure 1:
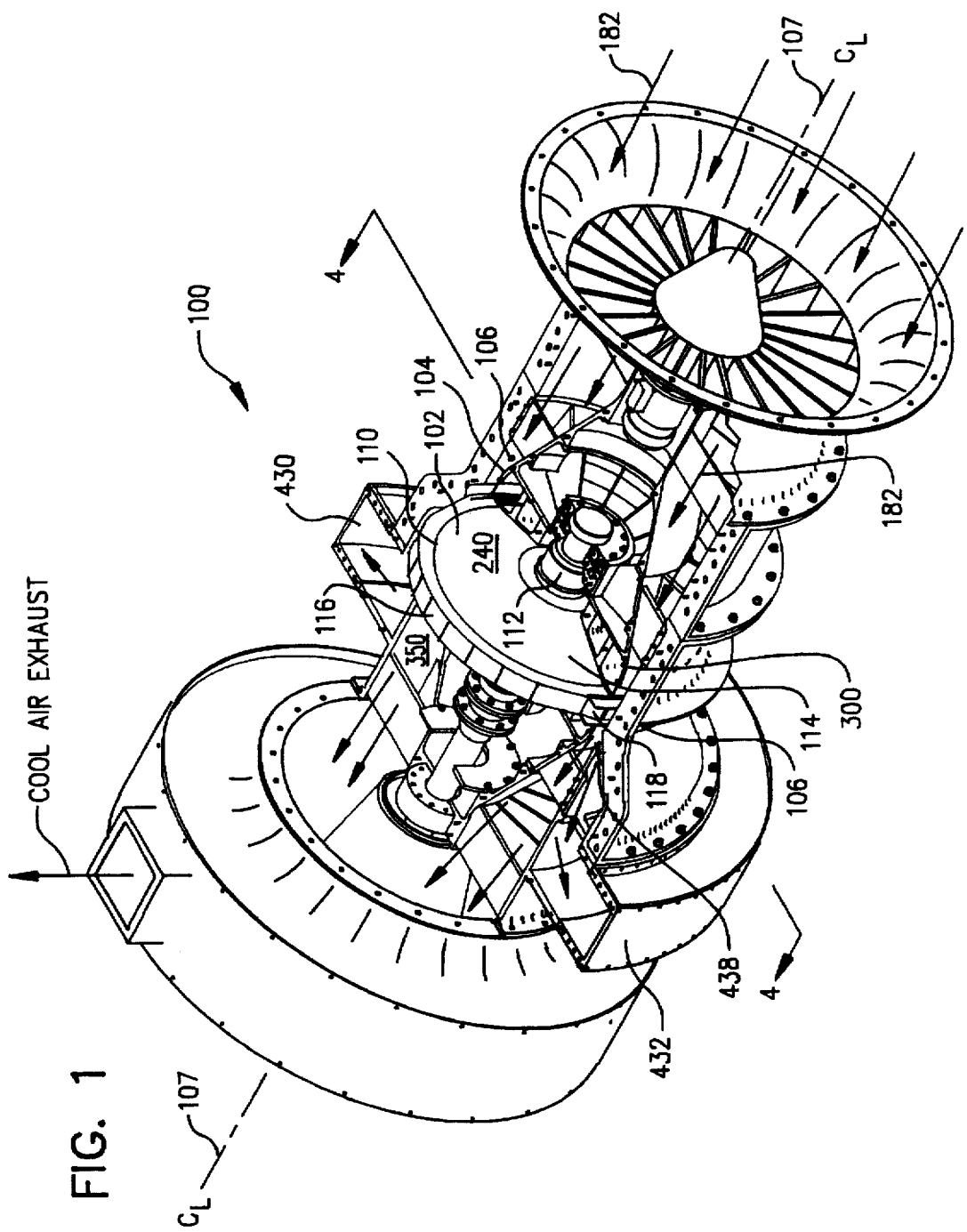
FIG. 1 provides a cut-away perspective view of the rotating assembly of my novel power plant apparatus, showing rotating output shaft portion affixed to a rotor and rotatably secured therewith, with the rotor having (i) a central hub, (ii) a tapered disc portion, and (iii) a unshrouded ramjet thrust module. Additionally, a combustion gas exhaust duct is illustrated.

Referring now to the drawing, FIG. 1 depicts a partial cut-away perspective view of my novel power plant 100. Rotating assembly 102 (at respective portions thereof) revolves in close proximity to the fixed inboard housing 104 and to the interior wall surface 105 of a stationary peripheral and preferably circumferential outboard housing 106, along a central axis of rotation 107. As illustrated, the rotating assembly 102 includes an output shaft 108 which provides and defines the axis of rotation. The output shaft 108 is affixed to rotor 110 at a central hub 112, and rotatably secured therewith.

Figure 6:
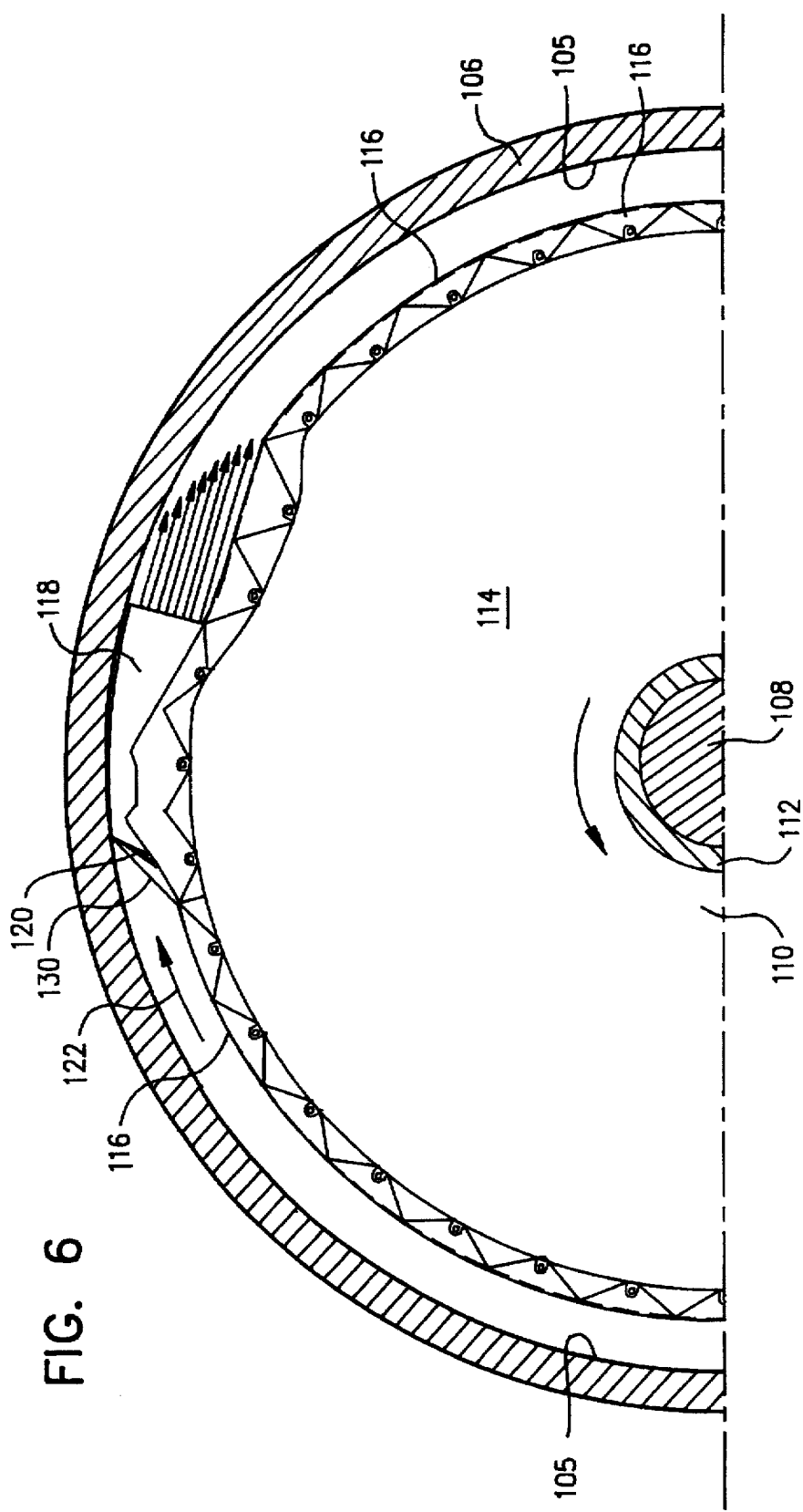
FIG. 6 is a side view of the rotor construction, showing the use of a non-circular disk with an external segmented cooling cap and integral ramjet thrust module, and showing the wall structure which forms the outboard portion of a thrust module as the unshrouded ramjet thrust module rotates therein.
Figure 7:
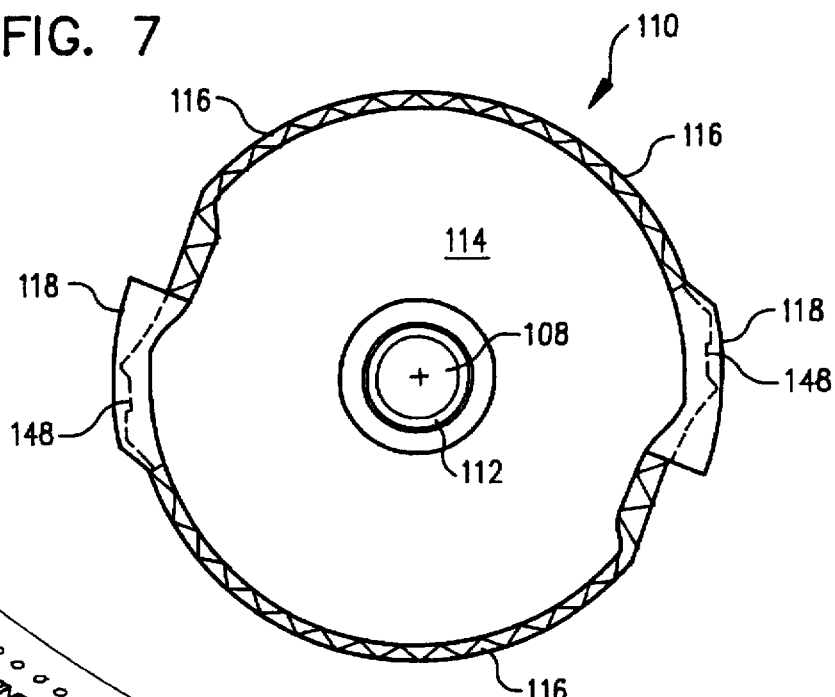
FIG. 7 is similar to FIG. 6, but showing only the rotor, thrust module inboard portions, and cooling cap.

As is most clearly evident in FIGS. 6 or 7, the rotor 110 is comprised of four basic sections, (i) a central hub 112, (ii) a solid tapered primary disc portion 114, (iii) cooling and protective rotor cap segments 116, and (iv) a ramjet thrust module 118.

Figure 8:
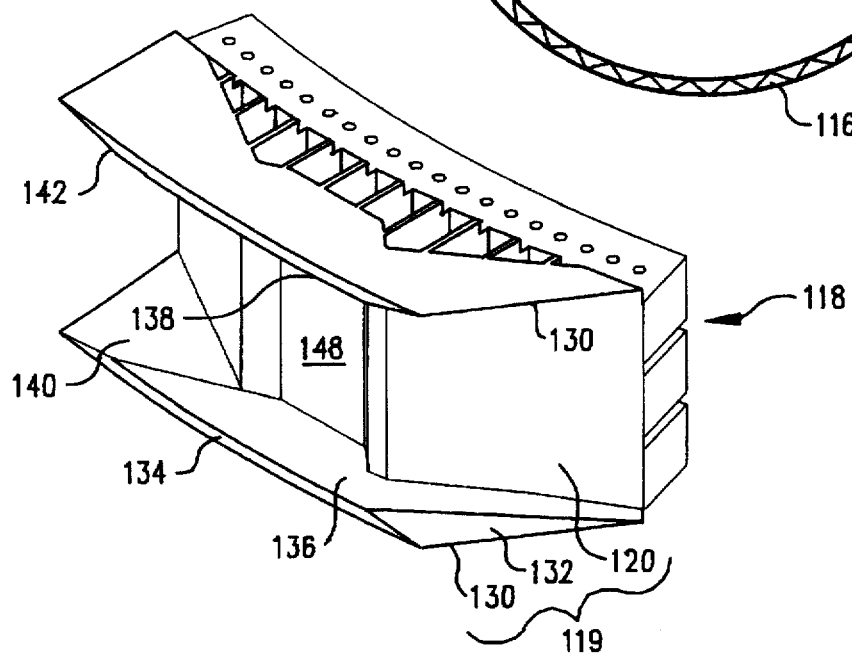
FIG. 8 provides a perspective view of the unshrouded thrust module, showing the structural layout which allows cooling.

The ramjet construction and operation provided in my power plant 100 is unique. The ramjet thrust modules 118 must work with the interior wall surface 105 of the outboard, stationary circumferential housing 106 in order to achieve compression of a portion of the inlet air flow 122. This is seen in FIGS. 6 and 8, for example, where the ramjet thrust module 118 has an inlet 119 includes (i) a first compression ramp 120 which performs the bulk of compression of inlet air flow 122, (ii) inlet structures 130, and (iii) inlet structure ramp surfaces 132. The pair of opposing leading edge inlet structures 130, located adjacent the lateral edges of first ramp 120, and preferably substantially parallel to the spin axis 123 of rotor 110 (and preferably substantially perpendicular to the axis of rotation of output shaft 108), provides the necessary lateral containment. Ramp surfaces 132 assist in compression of incoming air along the the ramjet thrust module 118 inlet. However, on the outboard side 134, thrust module has a slot opening defined by first 136 and second 138 inlet walls. These inlet walls, and corresponding trailing edge portions 140 and 142 which form outlet walls, allows the use of the interior wall surface 105 of the stationary circumferential peripheral housing wall 106, and complementary surface 144 (if any) of the segmented annular gate valve 146 as the remaining inlet air compression surface for the ramjet thrust module 118.

The importance of the development of my unique, unshrouded ramjet thrust module 118 will become further evident when the method of starting my ramjet driven power plant is discussed hereinbelow.

Figure 2:
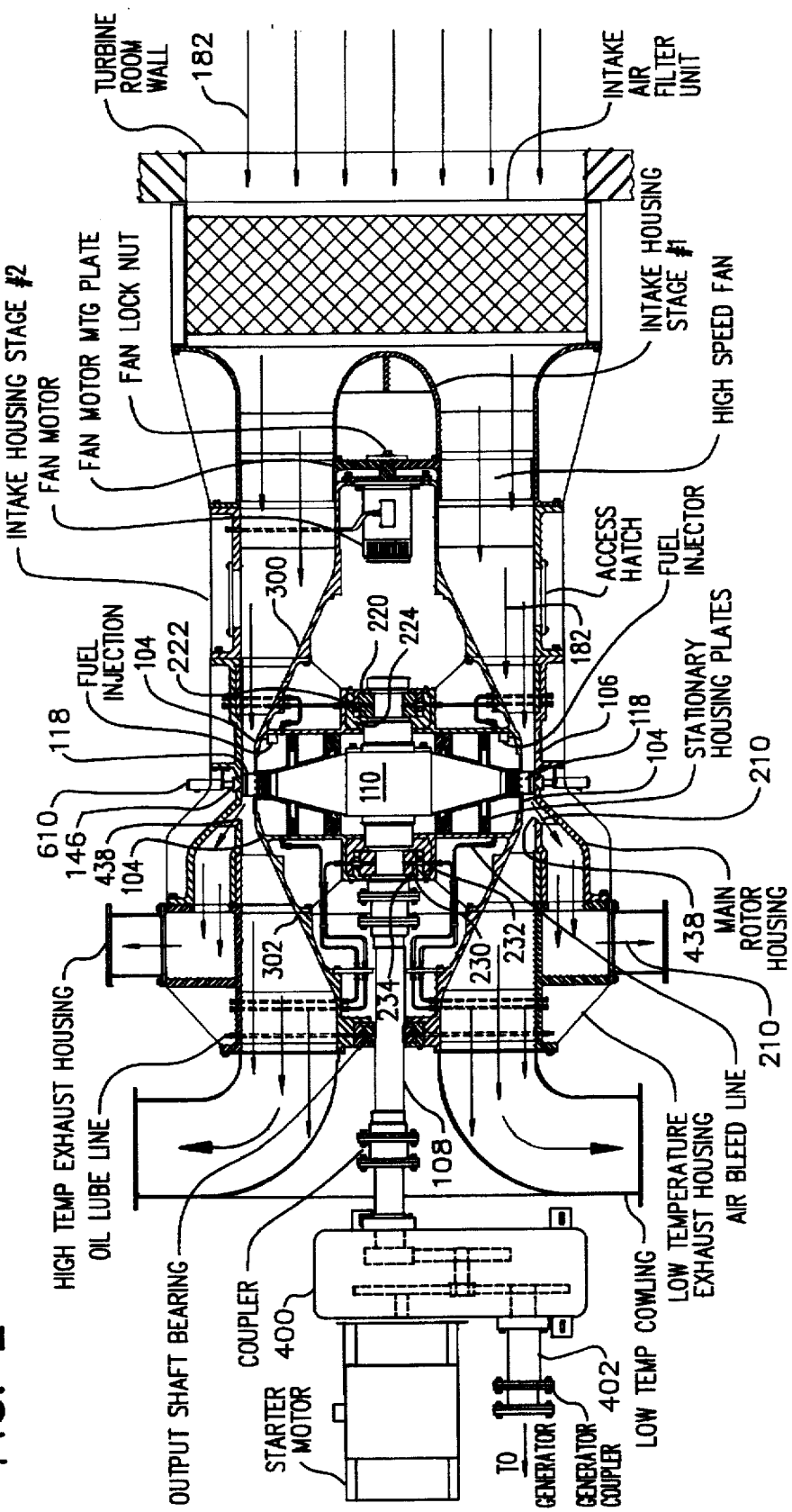
FIG. 2 is a top plan view in partial cross section, looking downward at the various components of my power plant.
Figure 3:
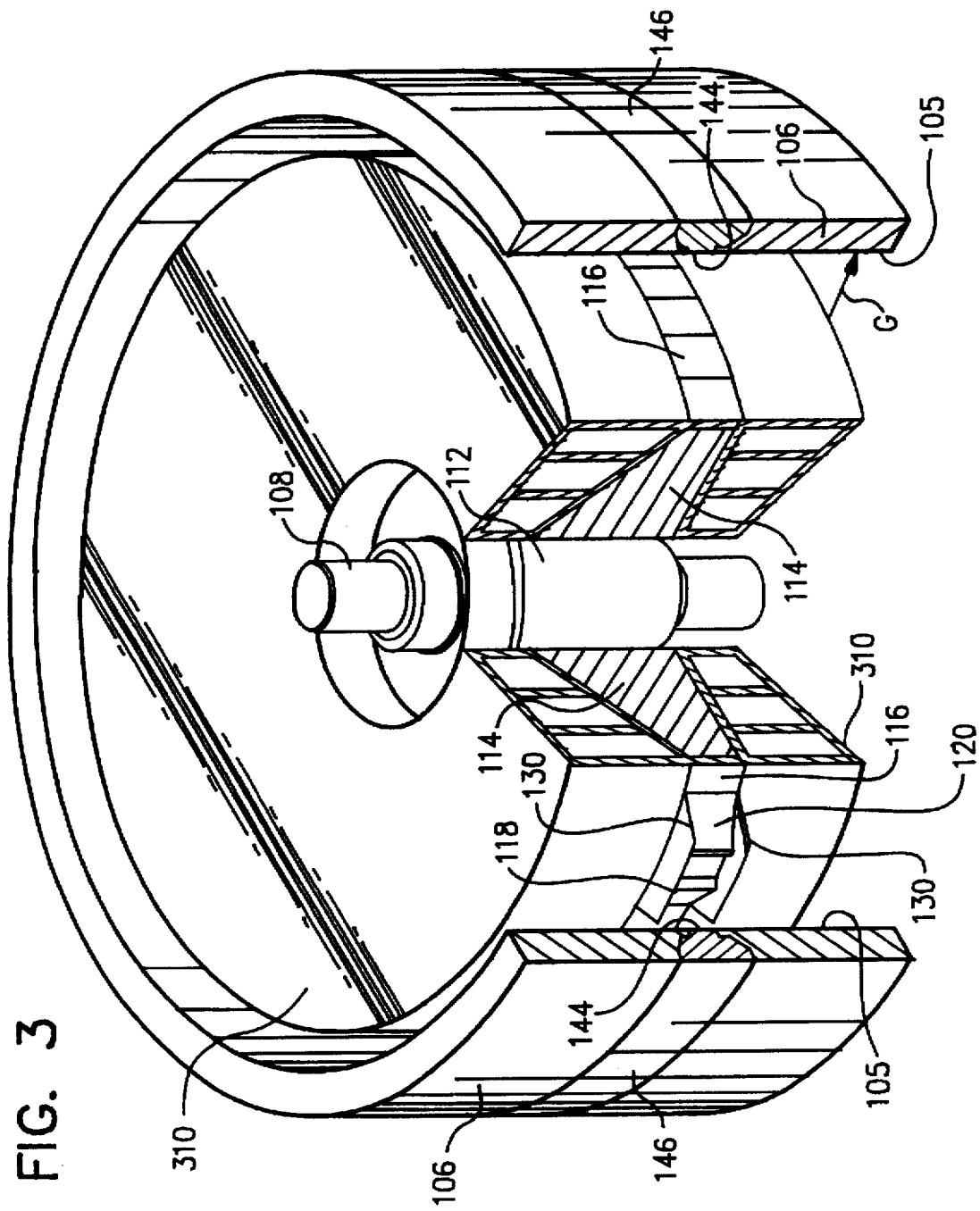
FIG. 3 is a perspective view showing an enlarged detail of the rotor for my power plant apparatus, showing the location of the integrally constructed ramjet thrust module inboard portion, and the relationship of the ramjet thrust module to the interior wall surface of the stationary circumferential housing.

Turning now to FIG. 2, the overall structure of the prime mover in my power plant is further illustrated in a partial cross-sectional view. Ramjets 118 are suitable for compressing inlet air and a fuel supplied thereto to oxidate the fuel and thus create a propulsive thrust from the exhaust gases 210 which are thereby created. Ideally, ramjet thrust modules 118 utilize oxygen from the incoming airflow 182 (from an ambient air supply at the plant site) as an oxidant source. Ramjets 118 are integrally provided at the outer reaches of rotor 110, so that the propulsive effect of the ramjets 118 can be utilized to turn rotating assembly 102, including rotor 110, central hub 112, the output shaft 108, so as to allow the ramjets 118, output shaft 108, and rotor 110, to rotate together as a single rotating assembly with respect to stationary circumferential inboard support structure or housing 104.

The rotor 110 (see FIGS. 1 or 2) is rotatably secured in an operating position by a fixed support structure or inboard housing 104 in a manner suitable for extremely high speed operation of the rotating assembly, particularly for operation in the range of 10,000 to 20,000 rpm, or higher. In this regard, suitable inlet side main bearings 220 and 222, are provided in bearing housing 224. Similarly, outlet side main bearings 230 and 232, are provided in bearing housing 234. These bearings, or suitable variations thereof, must provide adequate bearing support for high speed rotation and thrust, with minimum friction. The detailed bearing and lubrication systems may be provided by any convenient means by those knowledgeable in high speed rotating machinery, and need not be further discussed herein.

Figure 4:
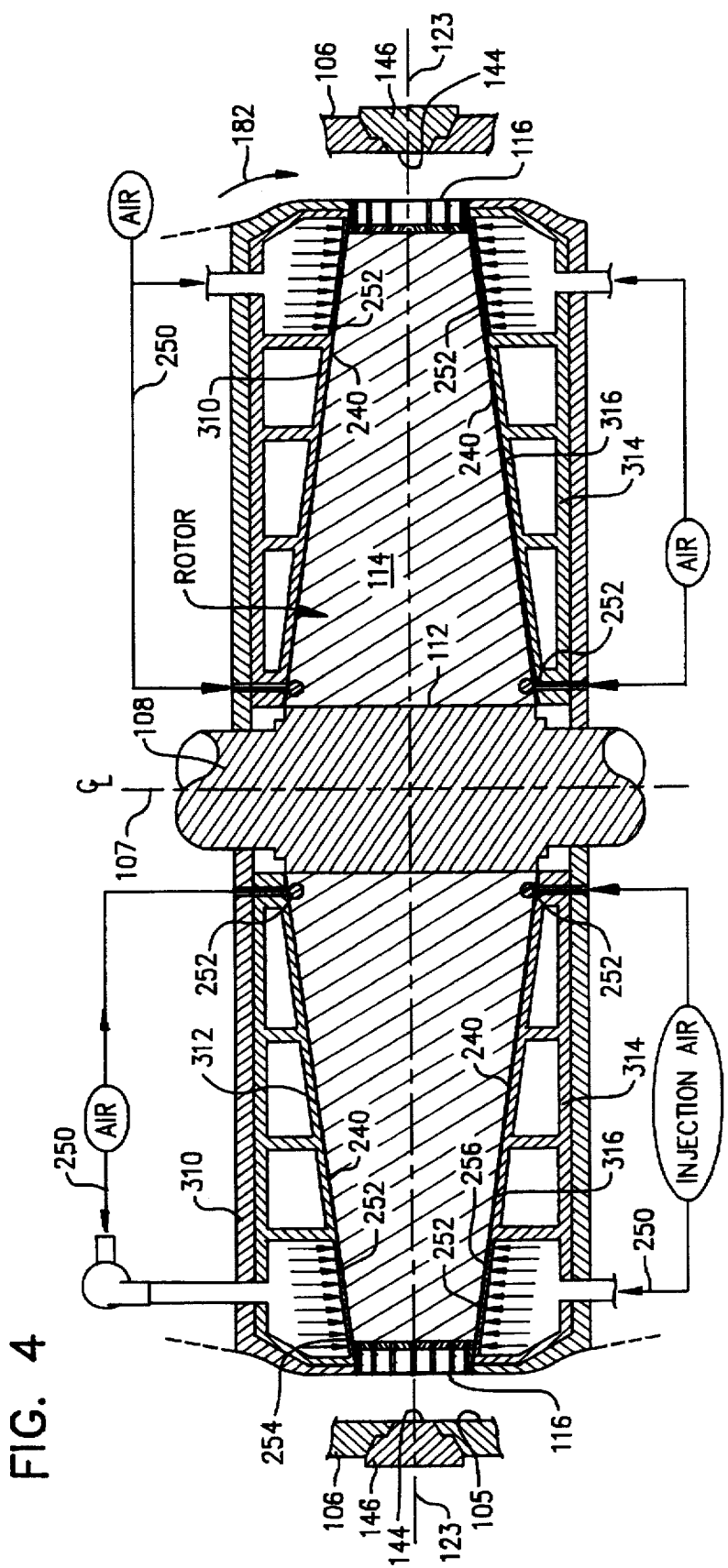
FIG. 4 is a partial cross sectional view, taken as if across a portion of line 4—4 of FIG. 1, but showing additional detail with respect to the air injection system used to reduce boundary layer drag on the rotor.
Figure 5:
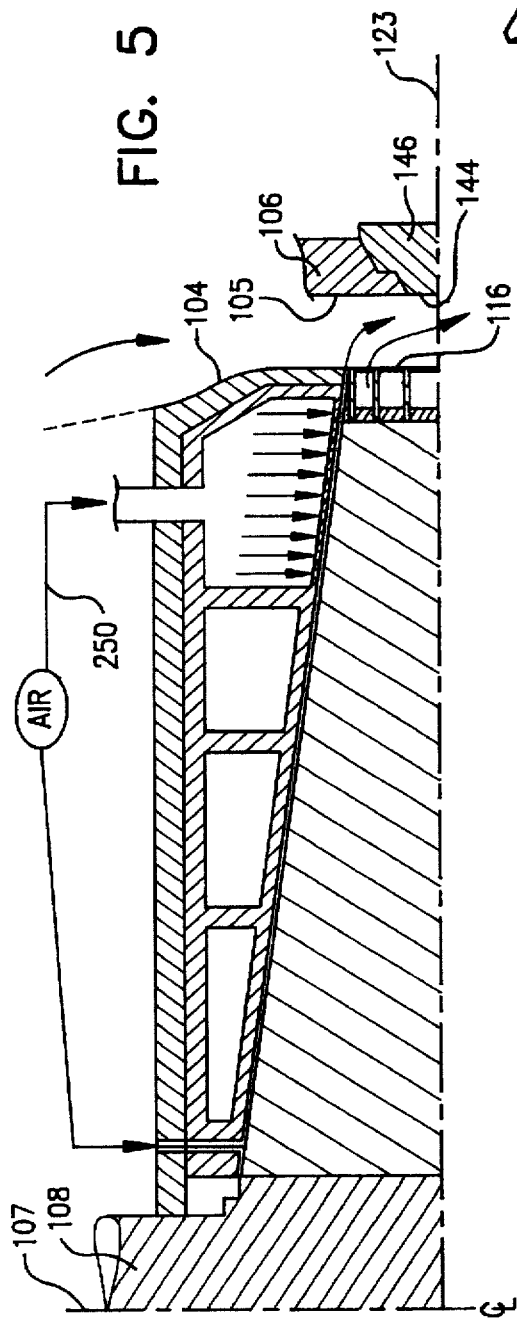
FIG. 5 is a partial cross sectional view, similar to that shown in FIG. 4, but providing still further detail of the air injection system used for simultaneous cooling and boundary layer drag reduction.
Figure 10:
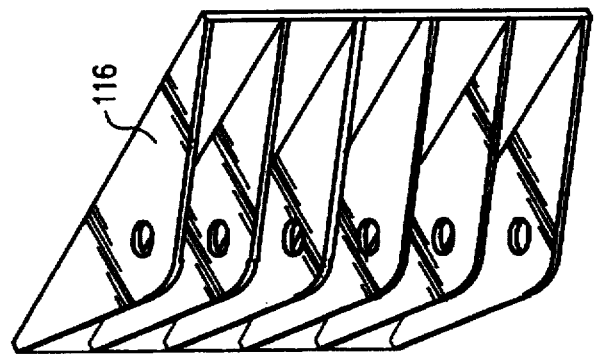
FIG. 10 is a perspective view of the rotor cooling caps, showing the location of cooling passageways.

Inboard housing and fixed support structure 104 includes several important features which are provided to reduce aerodynamic drag. First, as seen in FIG. 2, an inlet side inboard housing portion 300 is provided to smooth inlet air flow 182 as it approaches the thrust modules 118. Referring again to FIG. 2, a complementary outlet side inboard housing portion 302 is provided to smooth exit flow of sweep air. Second, as seen in FIG. 4, an inlet side, substantially annular rotor housing 310 with rotor side surface 312, and an outlet side, substantially annular rotor housing 314 with rotor side surface 316 are provided. The solid face portions 240 of rotor 110 rotates so that the rotor housing rotor side surfaces 312 and 316 are fixed in close proximity to rotating rotor solid face portions 240.

Injection air 250 for boundary layer control is provided through a plurality of apertures 252, primarily in the outboard portion 254 of surface 312, and primarily in the outboard portion 256 of surface 316. Injection air 250 impacts face 240 of rotor and then sweeps outward, cooling rotor cap segments 116, as well as the thrust module 118.

Adequate velocity of the air 250 flowing through the boundary layer injection apertures 252 may be determined by those knowledgeable in the art and to whom this specification is addressed.

The structural design and material systems used for the rotor 110 is critical because of the centrifugal loads induced by the extreme speed with which the rotor turns. The rotor 110 for the proposed power plant are anticipated to optimally turn at speeds between 10,000 and 20,000 rpm. Newly developed metal matrix composites do provide acceptable specific strength characteristics and can survive the required loads. The safety margin available when using such materials can be increased by increasing the material taper ratio, and when using such techniques, other materials of construction, including suitable composite carbon devices, become feasible. Preferably, in order to minimize the actual loading to the extent practical, the rotor means should be built with high strength materials in shapes which have large material taper ratios. This basically means that at increasing radial station, (further from the axis of rotation), the rotor means should become increasingly slender or thin. Fundamentally, reduction of rotating mass results in reduction of the encountered stress operating at the center of rotation.

Figure 13:
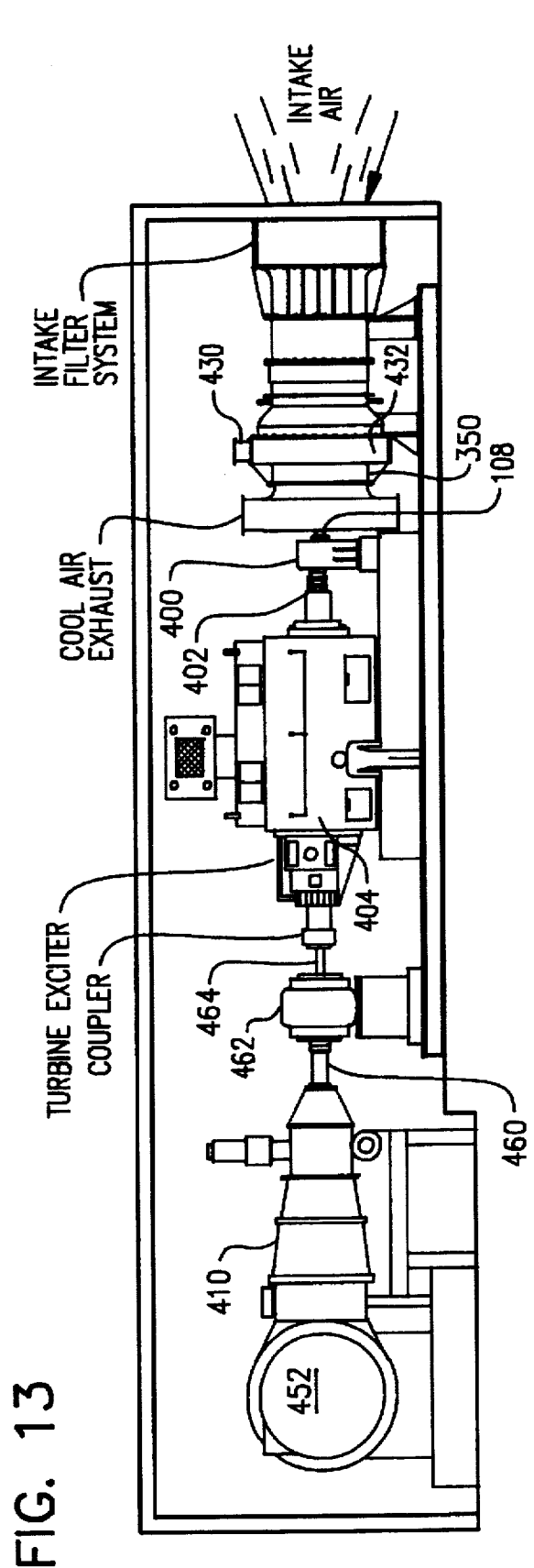
FIG. 13 is a side elevation view of a power plant constructed using my supersonic ramjet thrust module in conjunction with a conventional electrical generator set and steam turbine.
Figure 14:
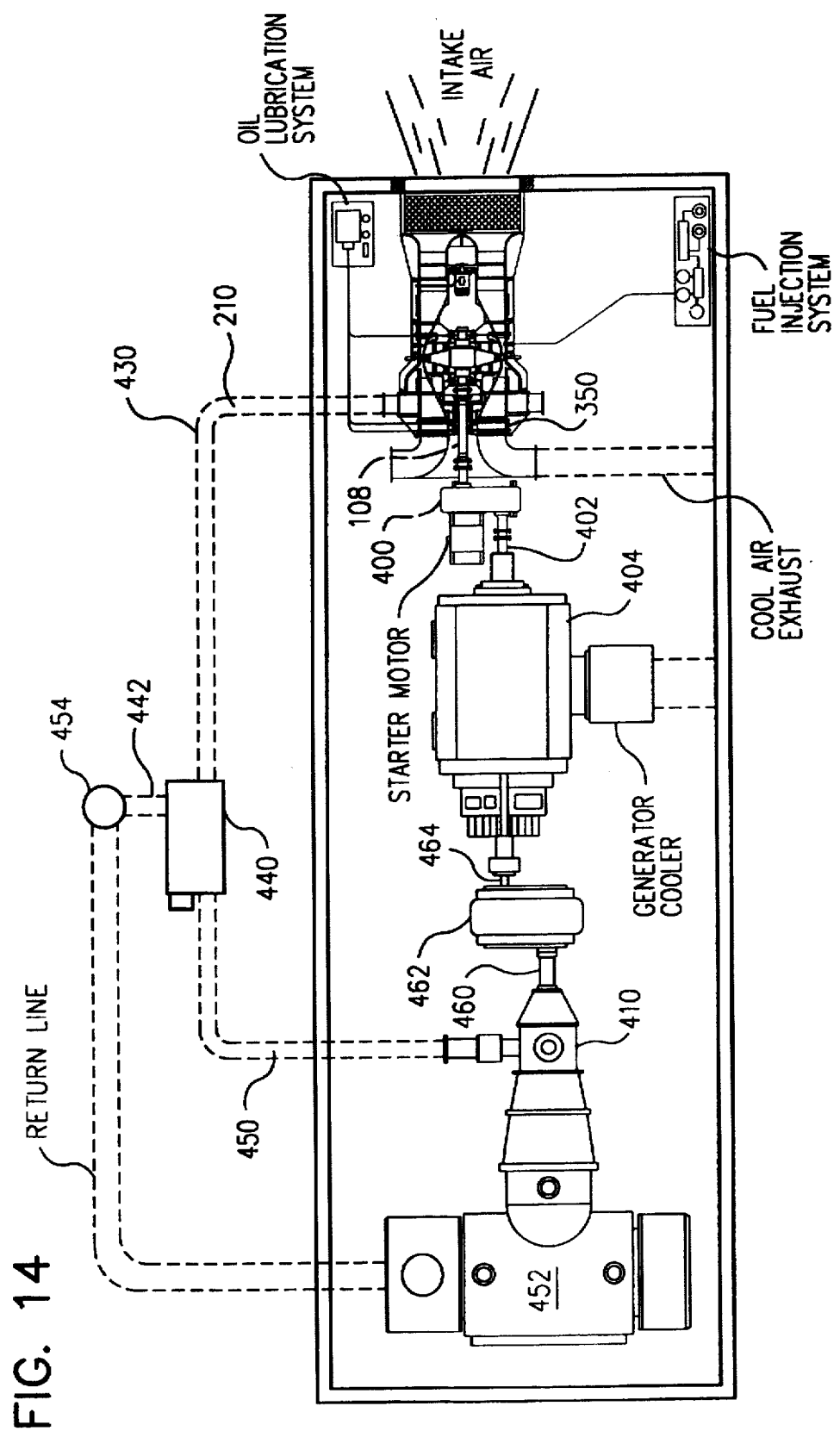
FIG. 14 is a plan view of a power plant constructed using my supersonic ramjet thrust module in conjunction with a conventional electrical generator set and steam turbine, as first illustrated in FIG. 13 above.

Attention is now directed to FIGS. 13 and 14, where my power plant is illustrated in conjunction with necessary power generation equipment. The output shaft 108 acts in conventional fashion to transmit mechanical power to the primary gear-box 400. The primary gear-box 400 reduces the output shaft 108 speed to a sufficiently low level to accommodate the capabilities of the desired application. In FIGS. 13 and 14, the primary, preferably variable speed gear-box 400 is connected by shaft 402 to primary electrical generator 404, suited to generate electrical power for transmission to a power grid or other electrical load. However, shaft 402 could be applied directly to do desired mechanical work.

Also shown in FIGS. 13 and 14 is the use of combustion exhaust gases 210 from ramjets 118 in a cogeneration system. As shown, the combustion exhaust gases 210 are conveniently collected by an exhaust gas duct 430. The exhaust gas duct 430 substantially surrounds and laterally encloses the through air plenum 350. Exhaust gases 210 are directed slightly outward toward a second housing sidewall 432 due to the rotational motion of the ramjet thrust modules 118 and the direction of their exhaust vector, and are separated at a dry knife 438 and then are largely collected in exhaust gas duct 430 without substantial cooling of the same by mixing with the supplied air vent stream passing through plenum 350. The combustion exhaust gases 210 are sent through exhaust gas duct 430 to a heat exchanger 440, through which a secondary working fluid or coolant 442 is circulated. In the usual design, the working fluid 442 will be water. The water can be heated to high pressure steam, and can thereafter be used: (a) to drive a steam turbine, for (i) shaft work or (ii) to drive an electrical generator, or (b) as process heat. The hot exhaust gases 210 from the ramjets 118 flow through heat exchanger 440, thus heating the fluid 442 therein. It may be convenient to design the heat exchanger system 440 as a boiler so that the fluid 442 changes state, i.e., water becomes steam, as it is heated, and in such cases the stream indicated as coolant out will be steam, suitable for use in heating, or in mechanical applications as illustrated with high pressure steam 450 provided to a steam turbine 410 to produce shaft work, and thence to a condenser 452, before return to the heat exchanger via pump 454. The turbine shaft 460 may be sent through a gearbox 462 and shaft 464 for use as shaft work in electric generator 404.

Figure 11:
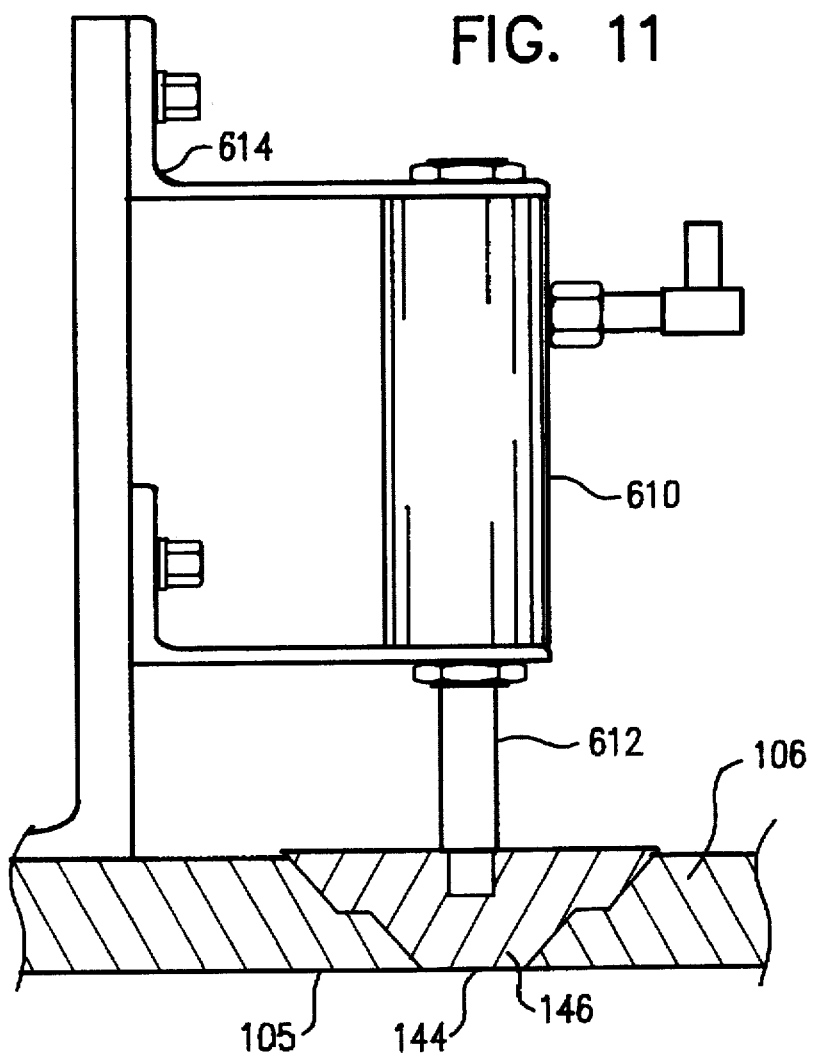
FIG. 11 is a diagrammatic illustration of the operation of a segmented annular gate valve, showing an annular gate valve in a closed position.
Figure 12:
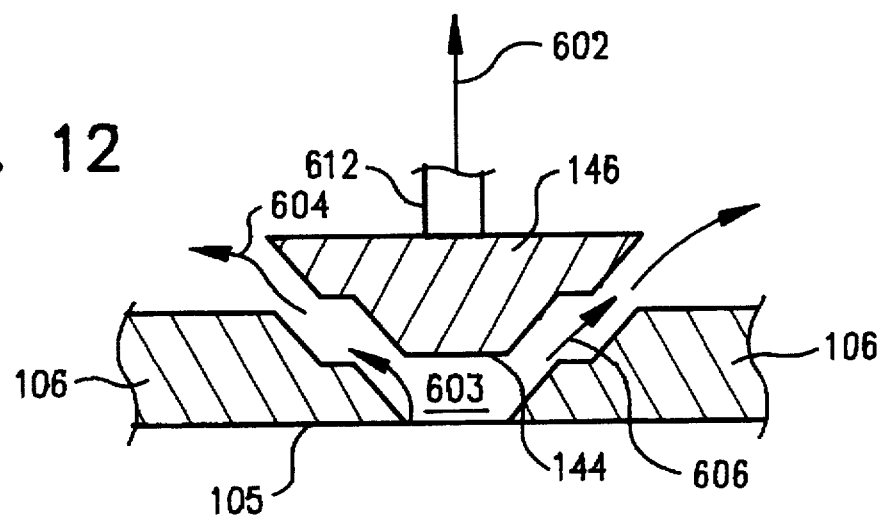
FIG. 12 is a diagrammatic illustration of the operation of the segmented annular gate valve first set forth in FIG. 11, showing an annular gate valve in an open position.

Turning now to FIGS. 11 and 12, in order to establish the desired internal shock structure in ramjet thrust module 118 for startup, the inlet air flow must conventionally either be accelerated to a Mach number greater than the design Mach number and then reduced after starting to the design Mach number, or the throat area must be temporarily increased to "swallow" the shock structure and thus induce startup. Depending upon the contraction ratio and Mach number, it may be impossible to increase the inflow Mach number to a sufficiently high level so as to start the inlet.

However, I have developed an alternative, unique variable geometry spill valve mechanism to decrease the airflow through ramjet thrust module 118, thus allowing startup at lower Mach numbers. While the exact requirements can be calculated from this disclosure by those skilled in the art, it must be pointed out that the exact requirements will be based on a set of specific assumptions regarding thrust module size, free stream conditions, and fuel source. Also, component performance levels must be predicted consistent with well established test or theoretical data for the inlet, transition section, combustor, and nozzle.

As seen in FIGS. 11 and 12, a series of variable position segmented annular gate valves 146 are provided around the edge of peripheral housing wall 106. For starting, the annular gate valves 146 are opened outward in the direction of reference arrow 602 as shown in FIG. 12, forming a gap 603, so that a portion of the inlet air flow 122 which is being compressed against the interior wall surface 105 can escape outwardly in the direction of arrows 604 and 606. The unique construction of ramjet thrust module 118 allows this escapement of bypass air as indicated by arrows 604 and 606. Once the ramjet thrust module 118 has "swallowed" the inlet shock structure, then the gate valve(s) 146 can be closed by actuator 610, as illustrated in FIG. 11. I have shown a hydraulic actuator 610 with shaft 612, mounted by bracket 614. Any mechanical, electrical, hydraulic or other actuator may be utilized as convenient for this purpose.

Because the ramjet thrust determines the overall power plant output, the thrust from the ramjet is an important figure of merit for overall plant output levels. The ramjet thrust levels and the overall plant output levels increase in direct proportion with the inlet air mass captured and processed by the ramjet. Thus, doubling the inlet area and mass capture results in doubling the thrust generated, and thus results in doubling the power output of the system.

Preferably, my ramjet is operated at a speed of at least Mach 2.0, and more preferably, is operated at a speed in excess of Mach 3.8. Most preferably, my ramjet thrust modules are operated at a speed of about Mach 3.5, or higher. Based on currently known economic trade-offs for materials of construction, operation between Mach 3.0 and 4.5 is anticipated.

Figure 9:
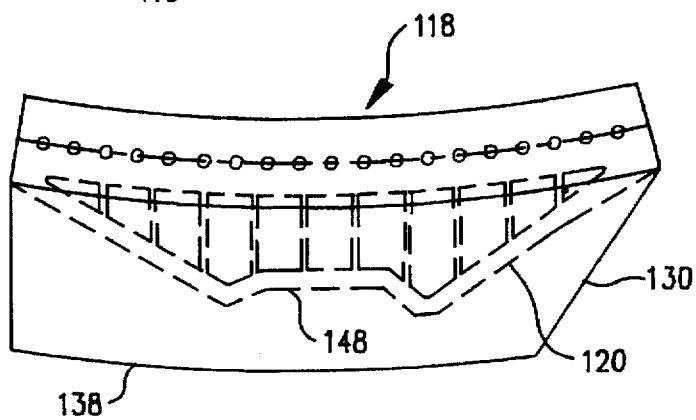
FIG. 9 is a top plan view of the unshrouded thrust module, further illustrating the layout of the cooling passageways.

The combustor temperature is a critical factor as combustor temperature varies with varying throttle settings. Combustor temperature must be balanced with inlet airflow rate and thrust module materials so as to maintain structural integrity in the combustor walls. To accommodate this design requirement, cast silicon carbide combustion chambers have been utilized as set forth in FIGS. 8 and 9. This combustion chamber is preferably made of a material with a desirable high temperature capability; selected from candidate materials include hot isostatic pressed alumina, silicon nitride, zirconia, beryllia, and silicon carbide. Ideally, the ramjet thrust module 118, including combustion chamber 148 is manufactured as a monolithic, solid cast part.

Finally, even though high combustion temperatures are experienced, my design allows extremely low nitrogen oxide output. This is because of the short residence times at the high combustion temperatures, and because the fuel is extremely well mixed. Residence times are determined by various design conditions, but as illustrated, a relatively small flow through residence time of 0.24 microseconds is expected. Fuel injected is being thoroughly mixed in by the shock front, and a well mixed air/fuel front enters the combustion chamber 118. This shock-boundary layer interaction premixing technique is a unique approach for achieving a near perfectly premixed conditions and low nitrogen oxides emission. Thus, nitrogen dioxide emissions are limited by limiting the size of highly non-equilibrium free-radical zones in the combustor. NOx emissions are estimated to be less than 10 ppm, and ideally, less than about 5 ppm, or EI is less than 0.5 grams of nitrogen dioxide per kilogram of fuel.

The method and apparatus for producing mechanical, electrical, and thermal power as described above provides a revolutionary, compact, easily constructed, cost effective power plant. The output from this power plant can be used in conjunction with existing power delivery systems, and represents a significant option for reducing air emissions by combustion of clean burning fuels. Further, given the efficiencies, dramatically less fuel will be consumed per unit of electrical, mechanical, or thermal energy generated.

It will thus be seen that the objects set forth above, including those made apparent from the proceeding description, are efficiently attained, and, since certain changes may be made in carrying out the above method and in construction of the apparatus and in practicing the methods set forth without departing from the scope of the invention, it is to be understood that the invention may be embodied in other specific forms without departing from the spirit or essential characteristics thereof. For example, while I have set forth an exemplary design utilizing a tapered disk configuration, other embodiments, such as a tri-rotor or quad-rotor (three or four "spokes," respectively extending from a central hub) are also feasible. Also, note that as taught, for example in FIG. 7, the rotor does not have to be symmetrical, but can be of varying radius to accommodate the ramjet thrust module 118 placement.

The present embodiments are therefore to be considered in all respects as illustrative and not as restrictive. Accordingly, the scope of the invention should be determined not by the foregoing description and the embodiments illustrated, but by the appended claims, and consequently all changes, variations, and alternative embodiments which come within the meaning and range of equivalents of the appended claims are therefore intended to be embraced therein.

I claim:

1. Apparatus for generation of power, said apparatus comprising:
    (a) an air inlet for supply of air for combustion of fuel;
    (b) a rotor having an axis of rotation, said rotor extending radially outward from said axis of rotation along to an outer extremity and adapted for rotation about said axis of rotation;
    (c) a stationary peripheral wall positioned radially outward from said axis of rotation and very slightly radially outward from said outer extremity of said rotor;
    (d) one or more ramjets, said one or more ramjets comprising
        (i) a rotating portion affixed at said outer extremity of said rotor, and
        (ii) a stationary peripheral wall portion,
    wherein said rotating portion and said stationary peripheral wall portion of each of said one or more ramjets cooperate to compress therebetween a portion of said air to allow said one or more ramjets to oxidize fuel supplied thereto and to generate combustion gases and thereby develop thrust from said combustion gases to turn said rotor and to thereby effect rotary motion of a shaft extending through said axis of rotation.

2. The apparatus of claim one further comprising a peripheral exhaust gas collection chamber, said peripheral exhaust gas collection chamber further comprising a dry knife edge separator, said dry knife separator adapted to efficiently direct combustion gases exiting said one or more ramjets to said peripheral exhaust gas collection chamber, so that said combustion gases are not appreciably cooled by mixing with an uncombusted portion of said air supplied to said apparatus.

3. The apparatus of claim one, wherein at least a portion of each of said one or more ramjets is provided in an unshrouded configuration, and wherein at least a portion of said stationary peripheral wall is provided to cooperate with the outer reaches of each of said one or more ramjets, so that during rotation about said axis of rotation, said rotating portion of each of said one or more ramjets spins closely adjacent to said portion of said stationary peripheral wall in a close fitting fashion, whereby a ramjet thrust is created between the rotating portion of each of said one or more ramjets and said stationary peripheral wall.

4. The apparatus as set forth in claim one, wherein said stationary peripheral wall portion is provided with one or more outlet passages for providing fluid communication between said air inlet and an external pressure relief location, said one or more outlet passages located radially outward from said one or more ramjets as said rotor is rotated about said axis of rotation, said one or more outlet passages adapted to allow escape through said outlet passages of at least a portion of the fluid being compressed by said one or more ramjets.

5. The apparatus as set forth in claim one, wherein each of said one or more ramjets utilize at least a portion of said stationary peripheral wall for inlet compression of said combustion gases.

6. The apparatus as set forth in claim one, wherein each of said one or more ramjets utilize at least a portion of said stationary peripheral wall for decompression of said escaping combustion gases.

7. The apparatus of claim 1 wherein each of said one or more ramjets operates at a speed of at least Mach 3.0.

8. The apparatus of claim 1 wherein each of said one or more ramjets operates at a speed between Mach 3.0 and mach 4.5.

9. The apparatus of claim 1 wherein each of said one or more ramjets operates at approximately mach 3.5.

10. The apparatus as set forth in claim 1, further comprising an annular gate valve, said annular gate valve being operatively located along a circumferential portion of said stationary peripheral wall, and wherein said annular gate valve is located in a position radially outward from and closely adjacent to said one or more ramjets as said one or more ramjets rotates thereby, said annular gate valve adapted to be moved from (a) an open position wherein a portion of the air ahead of said one or more ramjets escapes through said annular gate valve rather than being compressed in said one or more ramjets as said rotating portion of said one or more ramjets rotates adjacent thereto, to (b) a closed position wherein essentially no escapement of the air is provided therethrough.

11. An apparatus for generating power, comprising:
(a) a first housing means, said first housing means comprising a stationary peripheral wall portion, said stationary peripheral wall portion, and an air supply plenum;
(b) an output means, said output means comprising at least one shaft portion, said shaft portion rotatably secured about an axis of rotation by said first housing means;
(c) a rotor means, said rotor means secured to said output means, so that said rotor may rotate with said output means;
(d) an exhaust outlet passageway, and a peripheral exhaust gas collection chamber, said exhaust outlet passageway adjacent to, and, at the inlet thereof at least partially formed in, said stationary peripheral wall portion, said exhaust outlet passageway providing fluid communication between said air supply plenum and at least one peripheral exhaust gas collection chamber located radially outward from said axis of rotation of said rotor;
(e) a ramjet means, said ramjet means integrally formed between an unshrouded thrust module and said stationary peripheral wall, said ramjet means operating at a velocity of at least Mach 1, and said ramjet means further characterized in that said stationary peripheral wall is located in close proximity to said ramjet means when said ramjet means passes adjacent to a given location on said peripheral wall, whereby said ramjet means relies on at least a portion of said stationary peripheral wall to assist in compression of an inlet air stream into said ramjet means;
(f) said apparatus adapted to oxidize fuel in said ramjet means to generate combustion gases to produce thrust from said ramjet means so as to rotate said ramjet means, rotor means, and output means, to thereby provide power output from said apparatus.

12. The apparatus of claim 11 wherein said ramjet means operates at a speed of at least Mach 3.0.

13. The apparatus of claim 11 wherein said ramjet means operates at a speed between Mach 3.0 and mach 4.5.

14. The apparatus of claim 11 wherein said ramjet means operates at approximately mach 3.5.

15. The apparatus of claim 11, wherein said ramjet means further comprises a silicon carbide combustion chamber.

16. The apparatus as set forth in claim 15, wherein said combustion chamber comprises a monolithic silicon carbide portion.

17. The apparatus as set forth in claim 16, wherein said combustion chamber further comprises a replaceable cast silicon carbide monostructure insert.

18. A method of generating power, comprising:
(a) providing one or more thrust modules rotatably secured between a first, inboard housing and a second, stationary outboard housing;
(b) supplying an oxidizable fuel to said one or more thrust modules;
(c) oxidizing said fuel in said one or more thrust modules to
(i) generate combustion gases which escape therefrom, and to
(ii) generate a motive force by thrust reaction of said escaping combustion gases from (A) said one or more thrust modules, and (B) at least a portion of said second, stationary outboard housing,
(d) propelling said one or more thrust modules at a velocity in excess of Mach 1.0 through a supplied air stream by way of said motive force, said one or more thrust modules further characterized in that each of said one or more thrust modules relies on at least a portion of said second, stationary outboard housing to assist in compression of a portion of said supplied air stream, as each of said one or more thrust modules passes adjacent to said second, outboard housing;
(e) turning an output shaft operatively connected to said one or more thrust modules;
(f) whereby power is provided at said output shaft.

19. The method as recited in claim 18 wherein the velocity of said one or more thrust modules is at least Mach 3.0.

20. The method as recited in claim 19 wherein the velocity of said one or more thrust modules is between Mach 3.0 and Mach 4.5.

21. The method as recited in claim 20 wherein the operational velocity of said one or more thrust modules is approximately Mach 3.5.

22. The method as recited in claim 18, wherein said fuel is selected from the group comprising gaseous hydrocarbon fuels.

23. The method as recited in claim 22, wherein said fuel is essentially natural gas.

24. The method as recited in claim 18, wherein the step of supplying fuel includes the step of injecting fuel into an airstream between said first and said second housing at a point upstream of each of said one or more thrust modules.

25. The method as recited in claim 18, wherein said method further includes the step of generating electricity.

26. The method as recited in claim 25, wherein the step of generating electricity comprises operatively connecting an electrical generator to said output shaft.

27. The method as recited claim 26, further comprising the step directing said steam to a steam turbine, to generate power by rotation of said steam turbine by said steam, to produce shaft work from said steam turbine.

28. The method as recited in claim 27, further comprising the step of generating electricity from said shaft work of said steam turbine.

29. The method as recited in claim 18, wherein said method further includes the step of recovering thermal energy from said combustion gases.

30. The method as recited in claim 29, wherein said thermal energy recovery step comprises transfer of said thermal energy from said combustion gases to a secondary working fluid.

31. The method as recited in claim 30, wherein said secondary working fluid is water, and wherein steam is produced by heating said water.

32. The method as recited in claim 30, wherein said thermal energy recovery step comprises indirect heating of said water by said combustion gases in a heat recovery section.

33. The method as recited in claim 18, further comprising the step of controlling boundary layer drag as said rotor rotates at supersonic speed.

34. The method as recited in claim 33, wherein said step of substantially controlling boundary layer drag further comprises the step of injecting air tangentially to said rotational surface of said rotor.

35. The method as recited in claim 33, further comprising the step of providing flow of said supplied air stream at a rate sufficient to provide interior cooling in said segmented rotor caps.

36. The method as recited in claim 18, wherein the step of providing flow of said supplied air stream further comprises supplying external air to a supplied air plenum formed between said inboard housing and said outboard housing, to enable said one or more ramjets to engage fresh air substantially free of turbulence during passage of the next one of said one or more ramjets through a given rotational location.

37. The method as set forth in claim 18, wherein said combustion gases have less than ten parts per million of nitrogen oxides.

38. The method as set forth in claim 18, wherein said combustion gases have less than five parts per million of nitrogen oxides.

39. The method as set forth in claim 18, wherein oxidition of said fuel occurs in 0.24 microseconds or less.

40. An apparatus for generating power, comprising:
 a) first housing and a second, stationary circumferential peripheral wall housing;
 b) an output shaft, said output shaft rotatably secured about a central axis by said first housing;
 c) a rotor means, said rotor means securely affixed to said output shaft;
 d) at least one ramjet, said at least one ramjet
  (i) comprising an inboard portion securely affixed to said rotor means, said inboard portion further comprising a compression ramp;
  (ii) utilizing said stationary circumferential peripheral wall housing as an outboard portion, so that said stationary circumferential peripheral wall housing acts as a retaining surface against which said compression ramp compresses the air entering said at least one ramjet.

41. The apparatus of claim 40 wherein said at least one ramjet operates at a speed of at least mach 3.0.

42. The apparatus of claim 41 wherein said at least one ramjet operates at a speed between mach 3.0 and mach 4.5.

43. The apparatus of claim 41 wherein said at least one ramjet operates at approximately mach 3.5.

44. The apparatus of claim 40, wherein said output shaft is rotatably secured to said at least one ramjet by a rotor constructed of ultra-high strength composite construction.

45. The apparatus of claim 40, wherein said rotor further comprises carbon fiber composites.

* * * * *

UNITED STATES PATENT AND TRADEMARK OFFICE
CERTIFICATE OF CORRECTION

PATENT NO. : 5,709,076  Page 1 of 1
DATED : January 20, 1998
INVENTOR(S) : Lawlor, Shawn P.

It is certified that error appears in the above-identified patent and that said Letters Patent is hereby corrected as shown below:

<u>Title page, Item [54] and Column 1, line 1,</u>
Title, insert -- IMPROVED -- before the word "METHOD"

<u>Column 1,</u>
Line 14, after the word "prior" insert -- copending --
Line 29, delete "Of" and substitute therefore -- of --

<u>Column 10,</u>
Lines 18, 29, 39 and 43, delete "one" and substitute therefore -- 1 --
Lines 51 and 53, delete "mach" and substitute therefore -- Mach --

<u>Column 11,</u>
Lines 41 and 43, delete "mach" and substitute therefore -- Mach --

<u>Column 13,</u>
Line 12, delete "one" and substitute therefore -- 1 --
Lines 51 and 53, delete "oxidition" and substitute therefore -- oxidation --

<u>Column 14,</u>
Lines 11 and 15, delete "mach" and substitute therefore -- Mach --
Line 13, delete "mach 3.0 and mach 4.5" and substitute therefore
-- mach 3.0 and mach 4.5 --

Signed and Sealed this

Third Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 5,709,076
DATED        : January 20, 1998
INVENTOR(S)  : Lawlor, Shawn P.

It is certified that error appears in the above-identified patent and that said Letters Patent is hereby corrected as shown below:

<u>Title page, Item [54] and Column 1, line 1,</u>
Title, insert -- IMPROVED -- before the word "METHOD"

<u>Column 1,</u>
Line 14, after the word "prior" insert -- copending --
Line 29, delete "Of" and substitute therefore -- of --

<u>Column 10,</u>
Lines 9, 18, 29, 39 and 43, delete "one" and substitute therefore -- 1 --
Lines 51 and 53, delete "mach" and substitute therefore -- Mach --

<u>Column 11,</u>
Lines 41 and 43, delete "mach" and substitute therefore -- Mach --

<u>Column 13,</u>
Line 12, delete "oxidition" and substitute therefore -- oxidation --

<u>Column 14,</u>
Lines 11 and 15, delete "mach" and substitute therefore -- Mach --
Line 13, delete "mach 3.0 and mach 4.5" and substitute therefore
-- Mach 3.0 and Mach 4.5 --

This certificate supersedes Certificate of Correction issued February 3, 2005.

Signed and Sealed this

Twenty-ninth Day of March, 2005

JON W. DUDAS
*Director of the United States Patent and Trademark Office*